US008413963B2

(12) United States Patent
Pacheco, Jr.

(10) Patent No.: US 8,413,963 B2
(45) Date of Patent: Apr. 9, 2013

(54) DIRTBIKE MAINTENANCE APPARATUS

(76) Inventor: Deolvin N. Pacheco, Jr., Sylmar, CA (US)

( * ) Notice: Subject to any disclaimer, the term of this patent is extended or adjusted under 35 U.S.C. 154(b) by 821 days.

(21) Appl. No.: 12/590,483

(22) Filed: Nov. 9, 2009

(65) Prior Publication Data

US 2011/0108364 A1 May 12, 2011

(51) Int. Cl.

| | |
|---|---|
| ***B66F 5/02*** | (2006.01) |
| ***B66F 5/00*** | (2006.01) |
| ***B66F 3/00*** | (2006.01) |
| ***B60P 1/48*** | (2006.01) |

(52) U.S. Cl.

USPC ........ 254/134; 254/133 R; 254/120; 254/2 B; 254/7 B; 254/131; 254/10 B; 254/10 C

(58) Field of Classification Search .................. 254/134, 254/133 R, 120, 2 B, 7 B, 131, 10 B, 10 C; 187/220

See application file for complete search history.

(56) References Cited

U.S. PATENT DOCUMENTS

| | | | | |
|---|---|---|---|---|
| 388,526 | A | 8/1888 | Wilson | |
| 1,958,292 | A | 5/1934 | Barrett | |
| 2,945,220 | A | 4/1960 | Murphy | |
| 3,306,579 | A | 2/1967 | Campbell | |
| 4,534,544 | A | 8/1985 | Heidi | |
| 4,632,627 | A | 12/1986 | Swallows | |
| 4,690,378 | A * | 9/1987 | Jarman et al. | 254/8 B |
| 5,211,376 | A * | 5/1993 | Anderson | 254/134 |
| 5,518,224 | A | 5/1996 | Anderson | |
| 5,769,396 | A | 6/1998 | Tischendorf | |
| 5,979,878 | A | 11/1999 | Blankenship | |
| 6,089,544 | A * | 7/2000 | Ellis | 254/1 |
| 7,204,475 | B1 * | 4/2007 | Burry et al. | 254/88 |

* cited by examiner

*Primary Examiner* — Monica Carter
*Assistant Examiner* — Nirvana Deonauth
(74) *Attorney, Agent, or Firm* — Albert O. Cota

(57) ABSTRACT

A dirtbike maintenance apparatus (DMA) (10) having a dirtbike ramp (12); a dirtbike support assembly (42) with a lower horizontal member (44), a right vertical telescoping member (54), a left vertical telescoping member (78), an frame engagement plate (98); and an assembly attachment member (128); a front tire engagement assembly (134) with a hingedly attached tire plate (138); a right telescoping member (164) and a left telescoping member (194). The DMA (10) is placed on a level surface and a dirtbike (240) is directed onto and along the ramp (12). Once the dirtbike's front tire (242) contacts the tire plate (138), the engagement assembly (134) pivots forward, thereby pulling forward the right and left telescoping members (164,194). At the opposite end the telescoping members (164,194) are attached to the dirtbike support assembly (42). The support assembly (42) is pivotally attached so that as it is pulled forward, the frame engagement plate (98) is forced upwards and interfaces with the lower section of the dirtbike's frame (248), thereby elevating the middle and rear sections of the dirtbike (240).

21 Claims, 6 Drawing Sheets

38
98
138

38
98
138

38
98
138

DIRTBIKE MAINTENANCE APPARATUS

TECHNICAL FIELD

The invention generally pertains to motorcycle and dirtbike accessories, and more particularly to a dirtbike maintenance apparatus which allows a dirtbike to be quickly and easily elevated to facilitate repairs or other maintenance.

BACKGROUND ART

The invention of the internal combustion engine forever changed the way people travel from one location to another. Vehicles such as cars have become the leading form of transportation in most countries. While cars are an effective means of transportation especially for multiple people, two-wheel vehicles such as motorcycles are even more effective. Many people have discovered that for individual travel, a motorcycle has benefits that cars do not.

In the same way that the excitement of car racing has attracted many followers, riders of motorcycles also began to race. And, as both types of racing gained popularity, variations in the racing developed. One of the most popular variations was off-road motorcycle racing. Unfortunately, typical made-for-street-riding motorcycles were not capable of enduring the wear and tear of off-road racing. Thus, the dirtbike was developed. A dirtbike is similar to a street motorcycle in that they both have two tires, but dirtbikes are typically much lighter and do not possess the rider comforts found on a street bike. Also, a dirtbike is especially designed to be driven hard on very rough terrain, thus requiring a heavy duty suspension and special tires.

As a result of how and where dirtbikes are ridden, maintenance is a common requirement. Although dirtbikes are designed to take significant stress, they still must be routinely serviced to ensure that everything is in proper operating order.

Dirtbike mechanics, like motorcycle and car mechanics, must often work in confined spaces. Although dirtbikes usually provide easier accessibility to the engine and other areas, it can still be difficult to diagnose and/or repair a problem. This is especially true if the problem is located in one of the lower areas of a dirtbike. In that case it becomes necessary to somehow raise the dirtbike in order to view or access the lower areas. Even though dirtbikes are relatively light, once a dirtbike is raised it can still cause serious injury if it falls on someone.

It would be significantly beneficial to provide a means by which a dirtbike could be quickly and easily elevated for maintenance. It would be even more beneficial if the means were transportable, which would allow a dirtbike to be repaired at a location where a race or other competition was being held.

A search of the prior art did not disclose literature or patents that read directly on the claims of the instant invention. However, the following U.S. patents are considered related.

| PATENT NO. | INVENTOR | ISSUED |
|---|---|---|
| 5,518,224 | Anderson | 21 May 1996 |
| 5,769,396 | Tischendorf | 23 Jun. 1998 |
| 5,979,878 | Blankenship | 9 Nov. 1999 |

The U.S. Pat. No. 5,518,224 discloses a foot-operated motorcycle lift stand. A cyclist drives a motorcycle over the lift stand in its lowermost compact position. While manually steadying the motorcycle, the cyclist actuates a foot lever to shift a platform into lifting engagement with the undercarriage of the motorcycle by means of legs which pivotally secure the platform to a base. The foot lever pivots from its position adjacent one of the legs of the stand to an upstanding position, where additional foot pressure creates a turning moment to shift the legs and platform to a stable raised position. The cyclist's hands are then free to secure the lift stand. When not in use, the lift stand can be stored in an upright position whereby edges of the platform and base provide stable resting means.

The U.S. Pat. No. 5,769,396 discloses a multi-purpose motorcycle lift that includes a base, a lift assembly and a lift bar. A left leg is pivotally connected to the first end of the base, and a right leg is pivotally connected to the second end of the base. The front side of the left and right legs are pivotally connected to a front support, and the rear side of the left and right legs are pivotally connected to a rear support. The front and rear supports pivot in a parallel motion to the base. One end of the lift bar is fastened to the left leg and a stirrup protrudes from the other end such that a user may insert a shoe. The user operates the multi-purpose motorcycle lift by inserting a shoe into the stirrup and pushing downward until the left and right legs contact the base. A cotter pin may be inserted through a pair of projections to insure that the motorcycle lift doesn't return to a retracted position.

The U.S. Pat. No. 5,979,878 discloses a motorcycle stand apparatus that includes a base frame assembly having two longitudinal frame members and a transverse frame member connected therebetween. A first leg assembly, a second leg assembly and a lift platform are provided. The lift platform has a first platform side and a second platform side. A pair of first leg top pivots are connected between the top end of the first leg assembly and the first platform side and the second platform side.

For background purposes and as indicative of the art to which the invention relates, reference may be made to the following remaining patents found in the search.

| PATENT NO. | INVENTOR | ISSUED |
|---|---|---|
| 388,526 | Wilson | 28 Aug. 1888 |
| 1,958,292 | Barrett | 8 May 1934 |
| 2,945,220 | Murphy | 26 Apr. 1960 |
| 3,306,579 | Campbell | 28 Feb. 1967 |
| 4,534,544 | Heide | 13 Aug. 1985 |
| 4,632,627 | Swallows | 30 Dec. 1986 |

DISCLOSURE OF THE INVENTION

A dirtbike maintenance apparatus that functions in combination with a conventional dirtbike having a front tire, a rear tire, an engine and a frame. In its most basic design, the dirtbike maintenance apparatus is comprised of:

a. A dirtbike ramp having a channel running longitudinally the length of the ramp.

b. A dirtbike support assembly having a lower horizontal member, a right vertical telescoping member, a left vertical telescoping member, an frame engagement plate with a protective pad, and an assembly attachment member.

c. A front tire engagement assembly having a hingedly attached tire plate, and d. A right telescoping member and a left telescoping member.

A dirtbike is directed onto and along the ramp within the channel. As the dirtbike's front tire makes contact and applies pressure to the front tire engagement assembly's tire plate, the engagement assembly pivots forward, thereby pulling forward the right and left telescoping members. At the opposite end, the telescoping members are attached to the dirtbike support assembly. The support assembly is pivotally attached so that as it is pulled forward, the frame engagement plate is forced upwards. The engagement plate interfaces with the lower section of the dirtbike's frame below the engine, thus elevating the middle and rear sections of the entire dirtbike. Once in this elevated position, the dirtbike is held securely in place, ready for maintenance.

In view of the above disclosure, the primary object of the invention is to provide a dirtbike maintenance apparatus that will allow a person to quickly and easily elevate a conventional dirtbike and maintain the dirtbike securely in the elevated position for maintenance.

In addition to the primary object of the invention, it is also an object of the invention to provide a dirtbike maintenance apparatus that:

- is lightweight,
- can be easily transported from one location to another,
- can be permanently installed at a repair shop or other location,
- can be utilized by a single person,
- can accommodate dirtbikes of various sizes,
- is easy to understand and use,
- can be painted in various colors or include indicia, and
- is cost effective from both a manufacturer's and a consumers point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
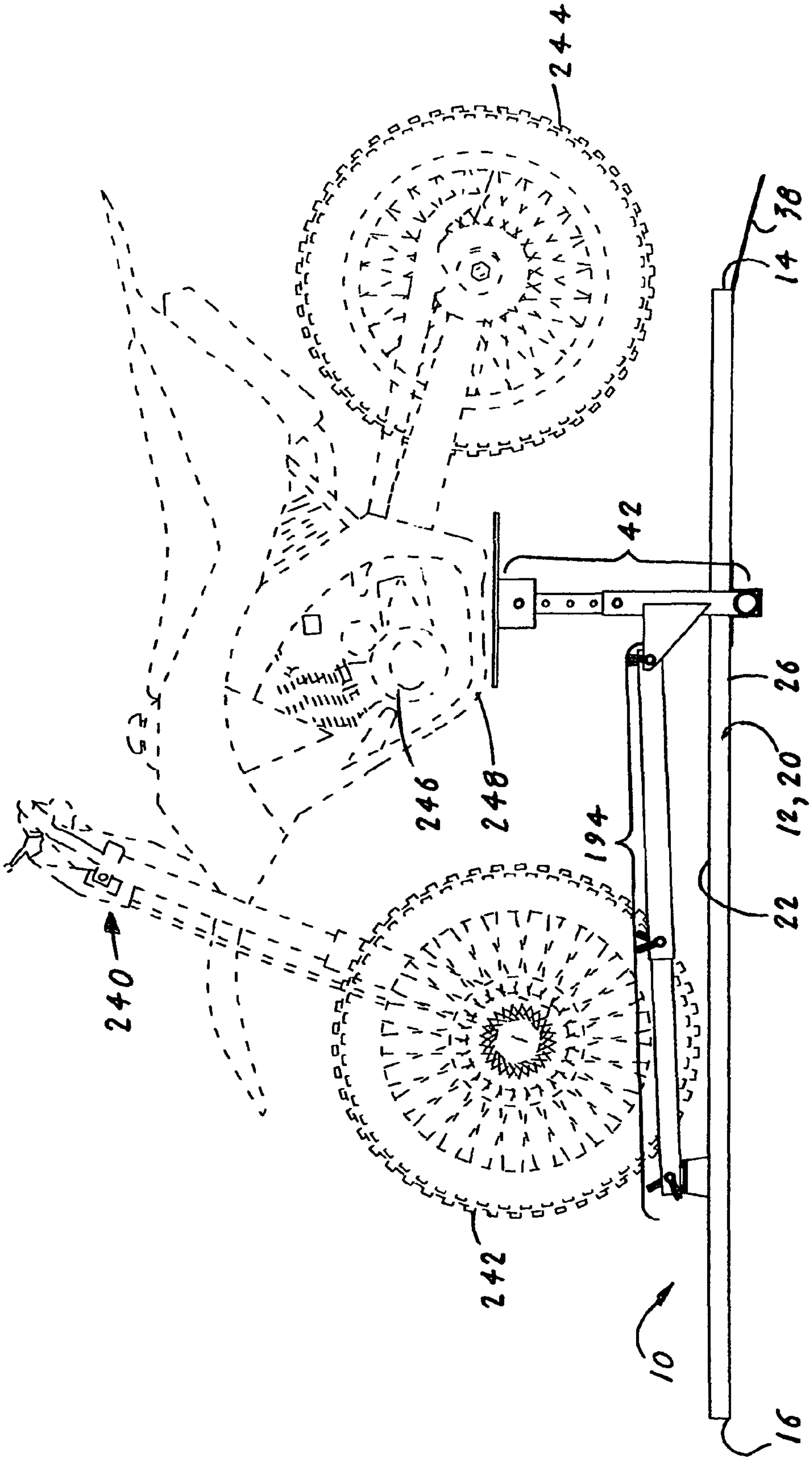
FIG. 1 is a side elevational view of a dirtbike maintenance apparatus (DMA) shown in its functional position with the middle and rear sections of the dirtbike elevated.

The best mode for carrying out the invention is presented in terms that disclose a preferred embodiment of a dirtbike maintenance apparatus 10 ("DMA 10"). Dirtbikes inherently require frequent repair and maintenance, as a result of the rough environment in which they are ridden. In order to facilitate dirtbike repair or maintenance it is often necessary to elevate the dirtbike Once a dirtbike is elevated, a person can then perform any needed work in the lower areas of the dirtbike.

There are several ways to elevate a dirtbike, but most utilize difficult, time-consuming and/or cumbersome methods. The instant invention addresses this problem by providing an apparatus that allows a single person to quickly and easily elevate the middle and rear sections of a dirtbike, and then safely maintain the dirtbike in the elevated position.

As shown in FIGS. 1-11, the DMA 10 is comprised of five major elements: a dirtbike ramp 12, a dirtbike support assembly 42, a front tire engagement assembly 134, a right telescoping member 164 and a left telescoping member 194. In order to provide a complete description of the DMA 10, a conventional dirtbike 240 having a front tire 242, a rear tire 244, an engine 246 and a frame 248 is illustrated and disclosed.

Figure 2:
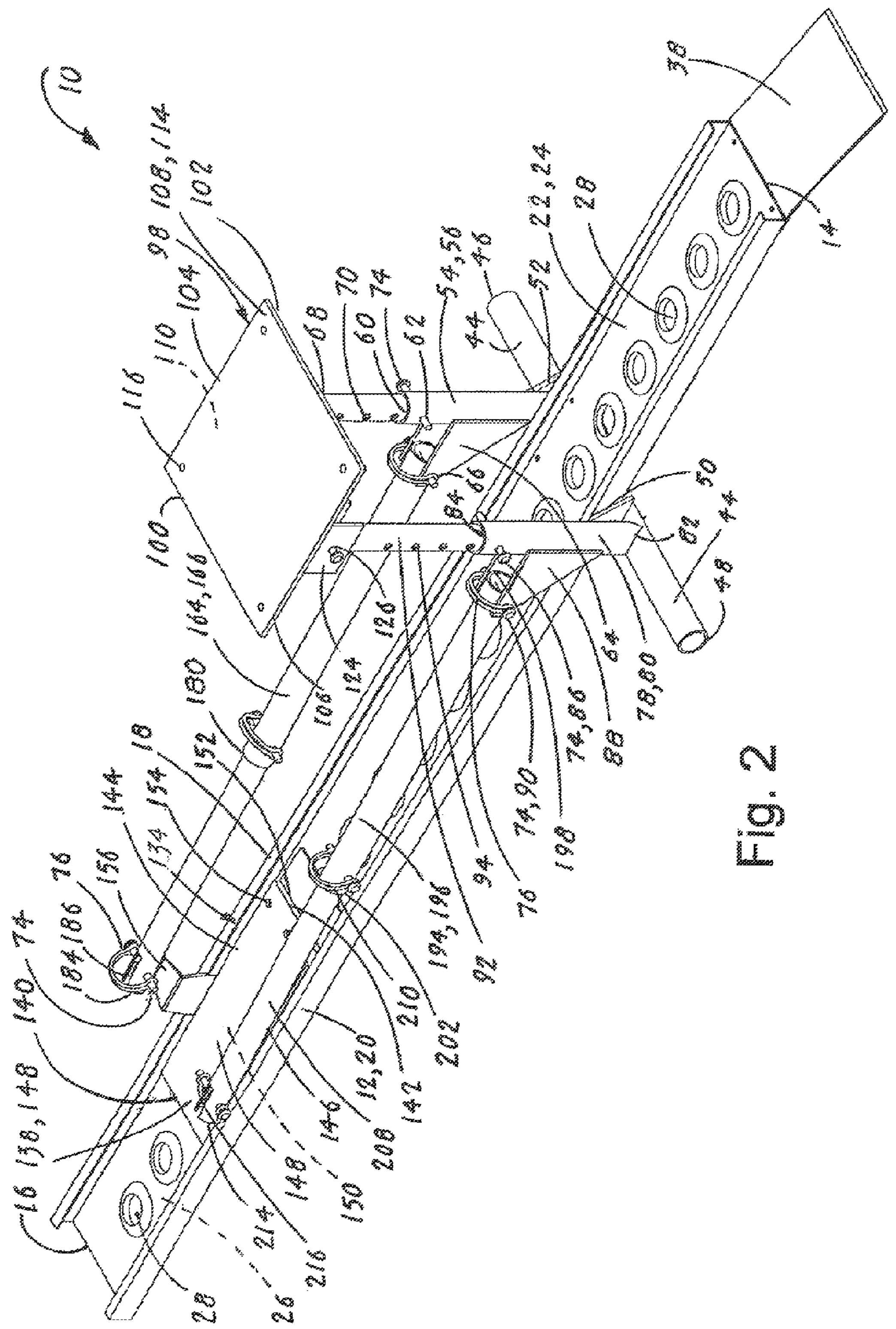
FIG. 2 is a perspective view of the DMA shown in its functional position.
Figure 3:
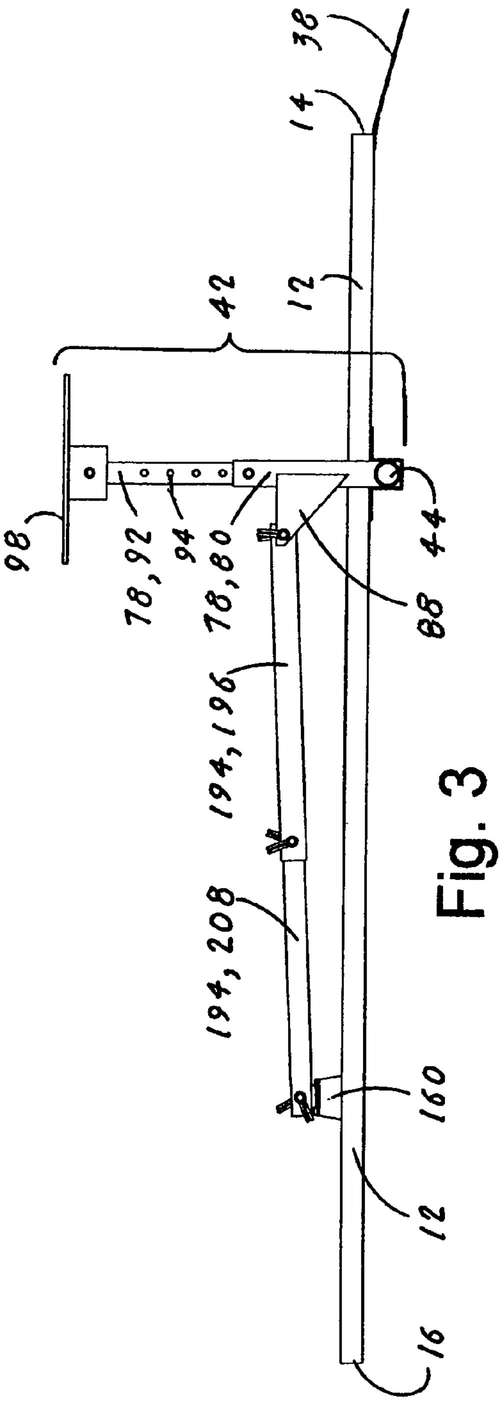
FIG. 3 is a left-side elevational view of the DMA.
Figure 4:
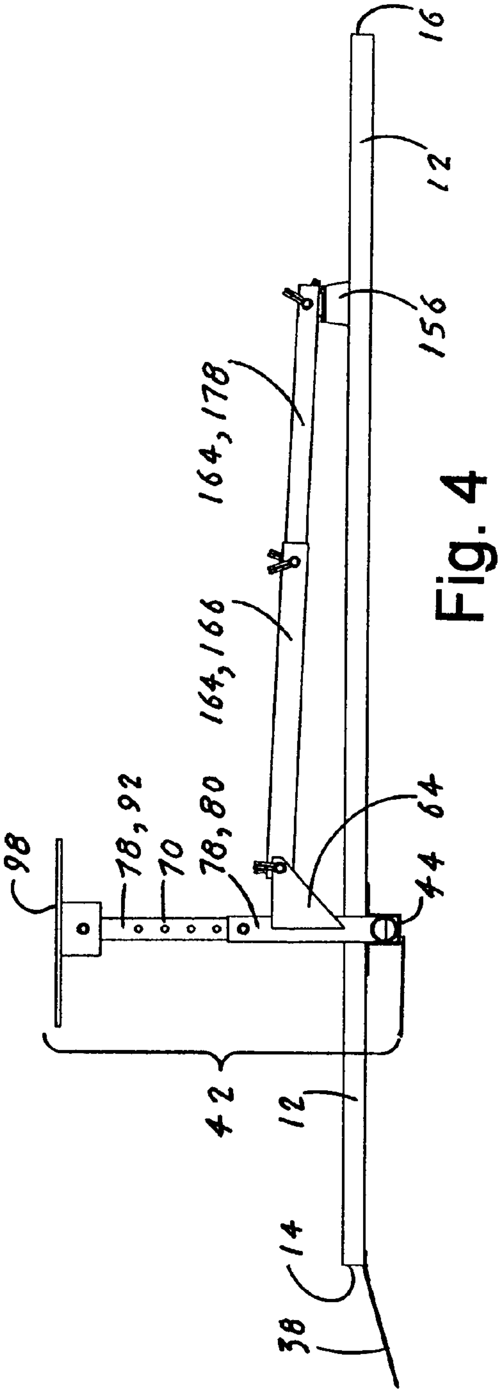
FIG. 4 is a right-side elevational view of the DMA.
Figure 5:
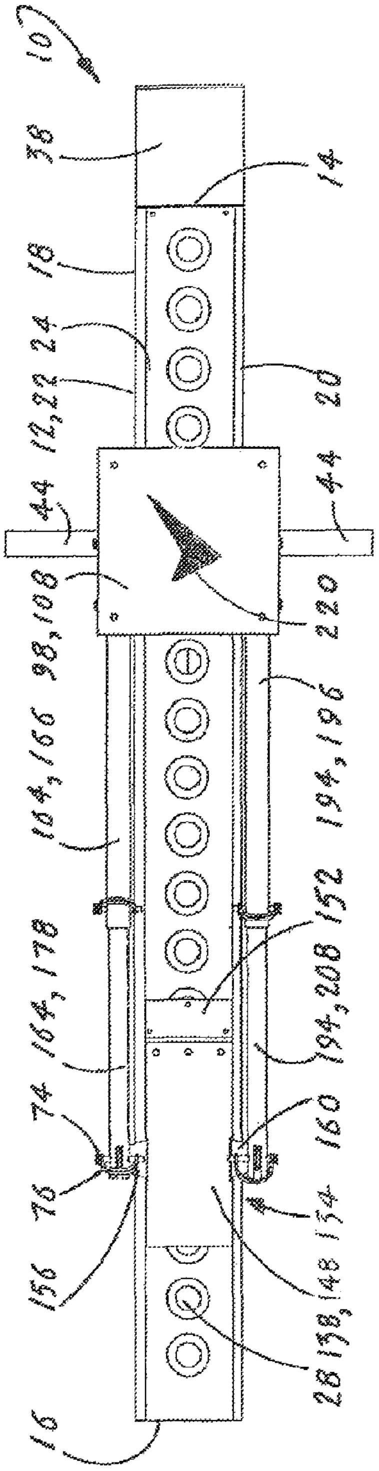
FIG. 5 is a top plan view of the DMA.
Figure 8:
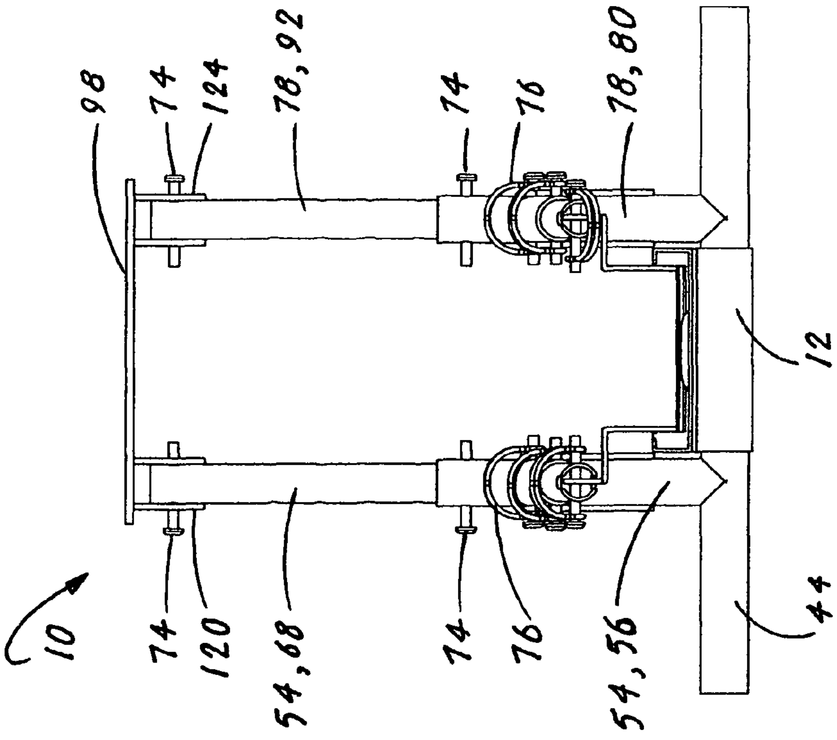
FIG. 8 is a rear elevational view of the DMA.
Figure 7:
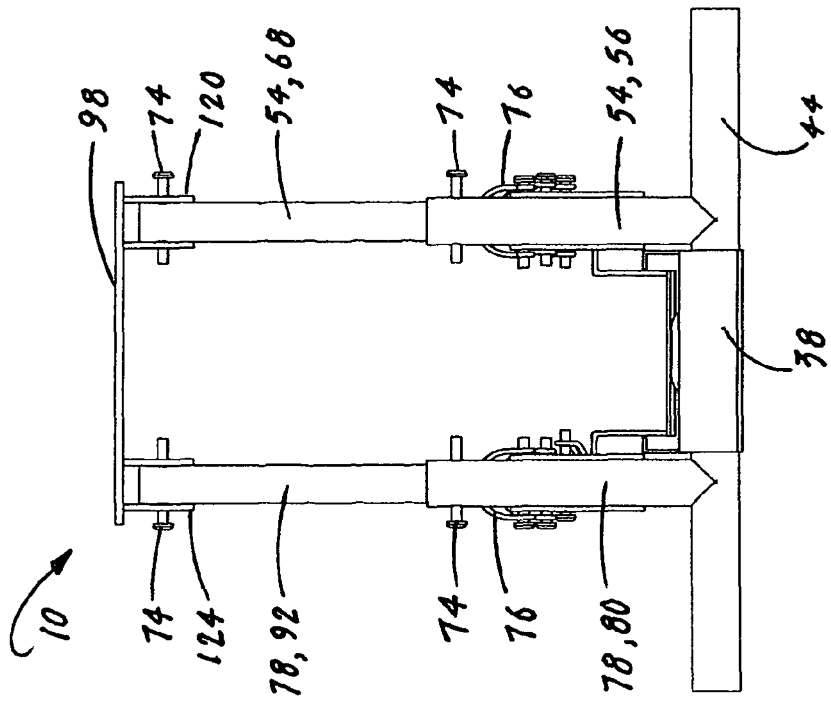
FIG. 7 is a front elevational view of the DMA.

The dirtbike ramp 12, as shown in FIGS. 1-6 and 8, is comprised of a first end 14, a second end 16, a right side 18, a left side 20, an upper surface 22 and a lower surface 26. Extending longitudinally the length of the ramp along the upper surface 22 is a channel 24, as shown in FIGS. 2 and 5. Located along the channel 24 are a plurality of openings 28, which reduce the weight of the ramp and improve traction on the ramp 12. Extending rearward from the first end 14 of the ramp 12 is a ramp extension 38. The extension 38 is attached by an attachment means to the edge of the first end 14 and angularly extends downward to the ground. The ramp extension 38 increases the ease by which a dirtbike 240 is directed onto the ramp 12.

The dirtbike support assembly 42, as shown in FIGS. 1 and 4, is comprised of a lower horizontal member 44 having a right end 46, a left end 48, a right ramp aligner 50 and a left ramp aligner 52. Extending upward from the right end 46 of the horizontal member 44 is a right vertical telescoping member 54 having a lower section 56 with a lower end 58 and an upper end 60 having a bore 62 therethrough. Extending and telescoping upward from the lower section 56 is an upper section 68 including a plurality of bores 70. Extending outward from the lower section 56 toward the ramp's first end 14 is a right bifurcated member 64 having a bore 66. Extending upward from the left end 48 of the horizontal member 44 is a left vertical telescoping member 78 having a lower section 80 with a lower end 82 and an upper end 84 including a bore 86 therethrough.

Extending and telescoping upward from the lower section 80 is an upper section 92 including a plurality of bores 94. Extending outward from the lower section 80 toward the ramp's first end 14 is a left bifurcated member 88 including a bore 90. The bores 62,86 on the lower sections 56,80 are designed to interface with one of the bores 70,94 on the respective upper sections 68,92. A securing pin 74 is utilized to maintain the upper section 68,92 attached to the lower section 56,80. Depending on which bore 70,94 on the upper section 68,92 is utilized the height of each vertical telescoping member can be raised or lowered. The lower ends 58,82 of the lower sections 56,80 of the two telescoping members 54,78 are each attached by an attachment means, which is preferably comprised of welding, adjacent to the respective right end 46 or left end 48 of the lower horizontal member 44, as best shown in FIGS. 2-8.

As shown in FIGS. 2-8, an frame engagement plate 98 is pivotally attached by an attachment means to both the upper end 60 of the right vertical telescoping member 54 and the upper end 84 of the left vertical telescoping member 78. Depending on the status of the DMA 10, the frame engagement plate 98 is either positioned parallel at the rear of the two telescoping members 54,78, which is the position when a dirtbike 240 is not being elevated, or the frame engagement plate 98 is perpendicularly positioned above the two telescoping members 54,78 when a dirtbike 240 is being elevated. As shown in FIG. 1 and described by its name, the frame engagement plate 98 is designed to support an elevated dirtbike 240 by interfacing with the lower section of the dirtbike's frame 248 that is below the engine 246. The frame engagement plate 98 itself is comprised of a rear edge 100, a front edge 102, a right edge 104, a left edge 106, a front or upper (depending on the DMA's status) surface 108 and a rear or lower surface 110. The attachment means for attaching the plate 98 to the telescoping members is comprised of a right bifurcated pivot member 120 including a bore 122 that extends rearward or downward from adjacent the right edge 104 of the plate 98, and a left bifurcated pivot member 124 including a bore 126 that extends rearward or downward from adjacent the left edge 106 of the plate 98. The bores 122 and 126 on the two pivot members 120,124 interface with the bores on each respective upper section 68,92 of the right and left vertical telescoping members 54,78. A securing pin 74 is inserted through the bores on each side, thereby allowing the frame engagement plate 98 to freely pivot from the parallel position to the perpendicular position on the two vertical telescoping members 54,78.

If desired, a protective pad 114 can be attached by an attachment means 116 to the front or upper surface 108 of the plate 98. The protective pad 114 is preferably made of a resilient material such as rubber and functions to protect the plate 98 from damage and to provide a more secure interface between the plate 98 and the lower area of the dirtbike's engine 246. The attachment means 116 for attaching the pad 114 to the plate 98 is selected from the group consisting of screws, an adhesive, a plurality of nut and bolt combinations or a hook and loop fastener. The hook and loop fastener allows the replacement of the protective pad 114 to be particularly quick and easy.

Figure 6:
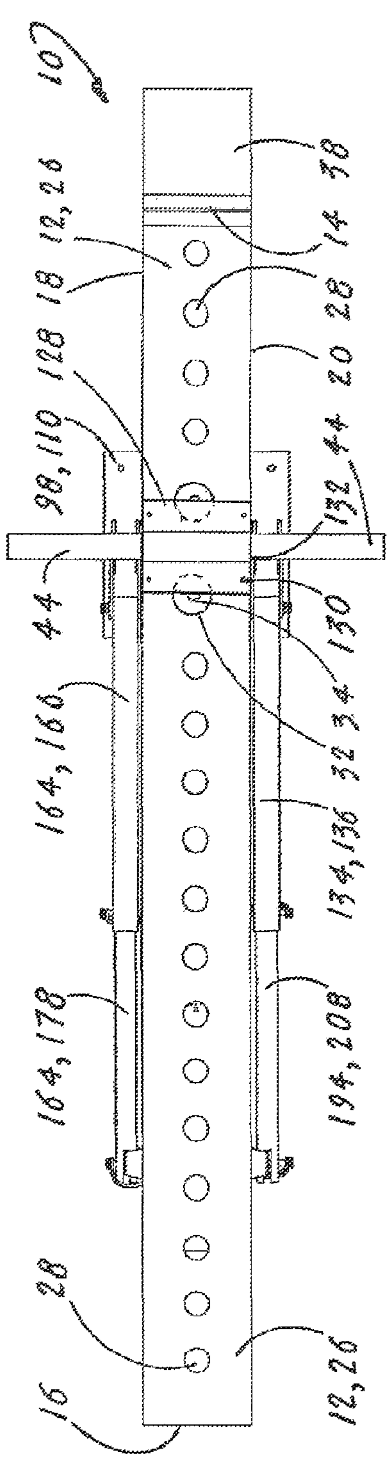
FIG. 6 is a bottom plan view of the DMA.

In order to pivotally attach the dirtbike support assembly 42 to the ramp 12, an assembly attachment member 128 is utilized. As shown in FIG. 6, the member 128 is attached by an attachment means 130 to the lower surface 26 of the ramp 12. The member 128 is shaped to allow the lower horizontal member 44 to freely extend through an opening 132 on a structure that extends downward. The member 128 can either be made as a single-piece unit, which is preferred, or the member 128 can comprise a plate and a separate downward-extending structure having an opening therethrough. When the two elements are utilized, the downward-extending structure is attached, preferably by welding, to the plate. As shown in FIG. 6, located between the assembly attachment member 128 and the lower surface of the ramp 12 is a pair of spacers 32 that maintain the attachment member 128 at an optimal distance from the ramp's lower surface 26. The attachment member 128 and the spacers 32 are attached to the lower surface 36 by means of a pair of nut and bolt combinations 34.

Located adjacent to the second end of the ramp 12, at a distance ranging from 30 inches to 36 inches from the dirtbike support assembly 42, is the front tire engagement assembly 134. As shown in FIGS. 2 and 5, the assembly 134 is comprised of a tire plate 138 having a rear edge 140, a front edge 142, a right edge 144, a left edge 146, an upper surface 148 and a lower surface 150. Attached to the front edge 142 is a hinge 152, which allows the plate 138 to be pivotally attached within the channel 24 on the ramp 12. An attachment means 154 is utilized to attach the hinge 152 to the ramp 12. The attachment means 154 preferably consists of welding although other attachment means such as a nut and bolt combination can also be utilized.

Extending outward from the right edge 144 of the plate 138, toward the first end 14 of the ramp 12, is a right Z-member 156 including a bore 158. Extending outward from the left edge 146 of the plate 138, toward the first end 14 of the ramp 12, is a left Z-member 160 including a bore 162.

As shown in FIGS. 2-6, extending along the two sides 18,20 of ramp 12 between the dirtbike support assembly 42 and the front tire engagement assembly 134 are the right telescoping member 164 and the left telescoping member 194. The right telescoping member 164 is comprised of a first section 166 having a first end 168 including a bore 170 and a second end 172 including a bore 174, and a second section 178 having a first end 180 including a plurality of bores 182 and a second end 184 including a slot 186 with a bore 188 therethrough.

The left telescoping member 194 is constructed identically to the right member 164 and also comprises a first section 196 having a first end 198 including a bore 200 and a second end 202 including a bore 204, and a second section 208 having a first end 210 including a plurality of bores 212 and a second end 214 including a slot 216 with a bore 218 therethrough.

The bores 170,200 on the first sections of the two telescoping members 164,194 interface with the bores 66,90 on the respective right and left bifurcated members 64,88 that extend outward from the lower section of each vertical telescoping member 54,78, as shown in FIGS. 2-4. A securing pin 74 is utilized to maintain the right and left telescoping members 164,194 attached to each respective vertical telescoping member 54,78. Additionally, to maintain the securing pin 74 within the bores, a U-clamp 76 can be attached to each pin 74.

The opposite ends of the telescoping members 164,194 are pivotally attached to the respective right and left Z-members 156,160 on the front tire engagement assembly 134. The right and left Z-members 156,160 are dimensioned to fit within the slots 186,216 on the respective second ends 184,214 of the telescoping member's second sections 178,208. Once the Z-members 156,160 are within their respective slots, the bores 158,162 are aligned and a securing pin 74 is inserted therethrough, as shown in FIGS. 2 and 5.

The right and left telescoping members 164,194 can be lengthened or shortened by use of the telescoping capability. The second section 178,208 of each member is dimensioned to slidably fit within the respective first section 166,196 of each member. The plurality of bores 182,212 on the first end 180,210 allow the second section 178,208 to be selectively placed at various distances into the first section 166,196. Once a desired length is chosen, the bores on the first section and the second section are aligned and a securing pin 74 is inserted therethrough, thereby maintaining the two sections attached together at the selected length. In order to maintain the securing pins 74 on each telescoping member 164,194, a U-clamp 76 can be attached to each securing pin 74. This feature allows the DMA 10 to be utilized with dirtbikes 240 of various sizes. For larger dirtbikes the two telescoping members 164,194 are lengthened to the appropriate distance, and for smaller dirtbikes the two members can be shortened.

In an alternate embodiment, the DMA 10 is constructed with no telescoping members. This embodiment would be utilized for a particular sized dirtbike 240. For example, there would be a small size DMA 10 that is dimensioned for dirtbikes up to 65 cc, a medium size DMA 10 for dirtbikes up to 150 cc, and a large size DMA 10 for dirtbikes up to 600 cc.

Additionally, indicia 220, as shown in FIG. 5, can be placed on the DMA 10. The indicia 220 can include words and/or images, such as sponsorship advertising or instructions for using the DMA 10.

Figures 9, 10, 11:
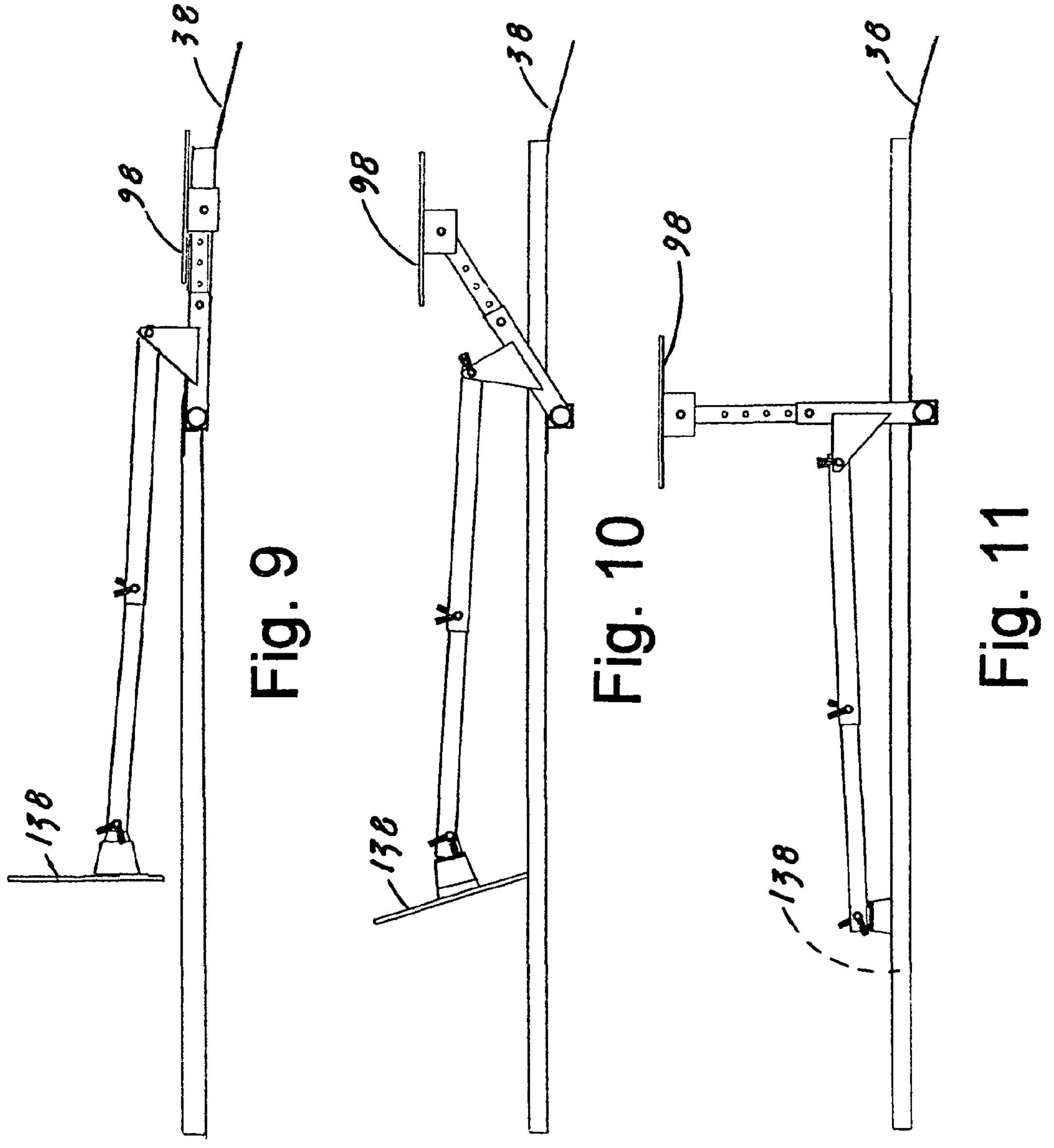
FIG. 9 is a side elevational view of the DMA shown in its pre-functional position.
FIG. 10 is a side elevational view of the DMA shown in its interim functional position.
FIG. 11 is a side elevational view of the DMA shown in its fully functional position.

In order to elevate the middle and rear sections of a dirtbike 240, the DMA 10 is placed on a level surface, as shown in FIG. 9. The dirtbike 240 is then directed onto and along the ramp 12. Once the dirtbike's front tire 242 contacts the front tire engagement assembly 134, the engagement assembly 134 pivots forward, thereby pulling forward the right and left telescoping members 164,194, as shown in FIG. 10. At the opposite end the telescoping members 164,194 are attached to the dirtbike support assembly 42. The support assembly 42 is pivotally attached so that as it is pulled forward, the frame engagement plate 98 is forced upwards, as shown in FIG. 11, where it interfaces with the lower section of the dirtbike's frame 248 that is located below the engine 246, thereby elevating the middle and rear sections of the dirtbike 240.

While the invention has been described in detail and pictorially shown in the accompanying drawings it is not to be limited to such details, since many changes and modifications may be made to the invention without departing from the spirit and the scope thereof. For example, at least one DMA 10 could be modified for permanent installation at a dirtbike repair facility. Hence, it is described to cover any and all modifications and forms which may come within the language and scope of the claims.

The invention claimed is:

1. A dirtbike maintenance apparatus (DMA) that functions in combination with a dirtbike having a front tire, a rear tire, an engine and a frame having a lower section, a middle section and a rear section, said DMA comprising a dirtbike ramp; a dirtbike support assembly having a lower horizontal member, a right vertical telescoping member, a left vertical telescoping member, a frame engagement plate and an assembly attachment member; a front tire engagement assembly having a hingedly attached tire plate; a right telescoping member, and a left telescoping member, wherein said DMA is placed on a level surface and a dirtbike is directed onto and along said ramp, wherein once the dirtbike's front tire contacts said front tire engagement assembly's is plate, said engagement assembly pivots forward, thereby pulling forward said right and left telescoping members, wherein at the opposite end said telescoping members are attached to said dirtbike support assembly, wherein said support assembly is pivotally attached so that as it is pulled forward, said frame engagement plate is forced upwards and interfaces with the lower section of the dirtbike's frame below the engine, thereby elevating the middle and rear sections of the dirtbike.

2. The dirtbike maintenance apparatus as specified in claim 1 wherein said apparatus is made of metal.

3. The dirtbike maintenance apparatus as specified in claim 2 wherein the metal is comprised of aluminum.

4. The dirtbike maintenance apparatus as specified in claim 1 wherein said dirtbike ramp is dimensioned to accept any size dirtbike tire.

5. The dirtbike maintenance apparatus as specified in claim 1 wherein said right telescoping member and said left telescoping member can be lengthened or shortened by use of a plurality of corresponding bores on each member and a securing pin.

6. The dirttbike maintenance apparatus as specified in claim 1 further comprising a protective pad that is attached over said frame engagement plate.

7. The dirtbike maintenance apparatus as specified in claim 1 wherein said dirtbike ramp further comprises a plurality of openings to provide weight reduction.

8. A dirtbike maintenance apparatus that functions in combination with a conventional dirtbike having a front tire, a rear tire, an engine and a frame, wherein said dirtbike maintenance apparatus is comprised of:

a) a dirtbike ramp having:
  (1) a first end,
  (2) a second end,
  (3) a right side,
  (4) a left side,
  (5) an upper surface with a channel, running longitudinally the length of said ramp,
  (6) a lower surface,
  (7) a plurality of weight reducing openings, b) a dirtbike support assembly having:
  (1) a lower horizontal member comprising a right end and a left end,
  (2) a right ramp aligner,
  (3) a left ramp aligner,
  (4) a right vertical telescoping member comprising a lower section with a lower end and an upper end including a bore, a right bifurcated member including a bore, and an upper section including a plurality of bores,
  (5) a left vertical telescoping member comprising a lower section with a lower end and an upper end including a bore, a left bifurcated member including a bore, and an upper section including a plurality of bores,
  (6) an frame engagement plate comprising a rear edge, a front edge, a right edge, a left edge, a front/upper surface, a rear/lower surface, a right bifurcated pivot member including a bore, and a left bifurcated pivot member including a bore,
  (7) an assembly attachment member that maintains said dirtbike support assembly attached to said ramp while allowing said support assembly to travel from a downward to an upward position, wherein located between the assembly attachment member and the lower surface of said ramp is a pair of spacers that maintain the attachment ember at an optimal distance from the ramp's lower surface, wherein the attachment member and the spacers are attached to the lower surface of said ramp by means of a pair of nut and bolt combinations, c) a front tire engagement assembly having:
  (1) a tire plate comprising a rear edge, a front edge, a right edge, a left edge, an upper surface and a lower surface,
  (2) a hinge including an attachment means, wherein the hinge is the means by which said tire plate is pivotally attached to said ramp,
  (3) a right Z-member including a bore, and
  (4) a left Z-member including a bore, d) a right telescoping member that extends between and is attached to said dirtbike support assembly and said front tire engagement assembly, wherein said right telescoping member having;
  (1) a first section comprising a first end including a bore and a second end including a bore,
  (2) a second section comprising a first end including a plurality of bores and a second end including a slot with a bore therethrough, e) a left telescoping member that extends between and is attached to said dirtbike support assembly and said front tire engagement assembly, wherein said left telescoping, member having:

(1) a first section comprising a first end including a bore and a second end including a bore, and (2) a second section comprising a first end including a plurality of bores and a second end including a slot with a bore therethrough, wherein once the dirtbike's front tire contacts said front tire engagement assembly's tire plate, engagement assembly pivots forward, thereby pulling forward said right and left telescoping members, wherein at the opposite end said telescoping members are attached to said dirtbike support assembly, wherein said support assembly is pivotally attached so that as it is pulled forward, said frame engagement plate is forced upwards and interfaces with the lower section of the dirtbike's frame located below the engine, thereby elevating the middle and rear sections of the dirtbike.

9. The dirtbike maintenance apparatus as specified in claim 8 wherein said apparatus is made of metal.

10. The dirtbike maintenance apparatus as specified in claim 9 wherein the metal is comprised of aluminum.

11. The dirtbike maintenance apparatus as specified in. claim 9 wherein the metal is comprised of stainless steel.

12. The dirtbike maintenance apparatus as specified in claim 11 wherein the stainless steel is powder coated.

13. The dirtbike maintenance apparatus as specified in claim 8 wherein said dirtbike ramp is dimensioned to accept any size dirtbike tire.

14. The dirtbike maintenance apparatus as specified in claim 8 wherein said dirtbike ramp further comprises a ramp extension that extends rearward and downward from the Inst end of said ramp, wherein the ramp extension is attached to the first end by an attachment means and wherein the ramp extension increases the ease by which a dirtbike is directed onto said ramp.

15. The dirtbike maintenance apparatus as specified in claim 8 wherein said right telescoping member and said left telescoping member can be lengthened or shortened by use of a securing pin that is removably inserted into the corresponding bores on each member.

16. The dirtbike maintenance apparatus as specified in claim 15 further comprising a U-clamp that is attached to each securing pin to maintain the pins securely within the bores.

17. The dirtbike maintenance apparatus as specified in claim 8 wherein said right vertical telescoping member and said left vertical telescoping member can be lengthened or shortened by use of a securing pin that is removably inserted into the corresponding bores on each member.

18. The dirtbike maintenance apparatus as specified in claim 8 further comprising a protective pad which is attached to said engagement plate by an attachment means.

19. The dirtbike maintenance apparatus as specified in claim 18 wherein the attachment means are selected from the group consisting of screws, an adhesive, a plurality of nut and bolt combinations and a hook and loop fastener.

20. The dirtbike maintenance apparatus as specified in claim 8 further comprising indicia.

21. A dirtbike maintenance apparatus (DMA) comprising a dirtbike ramp, a dirtbike support assembly having a lower horizontal member, a right vertical member, a left vertical member, and an frame engagement plate, a front tire engagement assembly having a tire plate, a right member, and a left member, wherein said DMA is placed on a level surface and a dirtbike is directed onto and along said ramp, wherein once a front tire on the dirtbike contacts said front tire engagement assembly's tire plate, said engagement assembly pivots forward, thereby pulling forward said right and left members, wherein at the opposite end said right and left members are attached to said dirtbike support assembly, wherein said support assembly is pivotally attached so that as it is pulled forward, said frame engagement plate is forced upwards and interfaces with the lower section of the dirtbike's frame located below the engine, thereby elevating the middle and rear sections of the dirtbike.

* * * * *